Sept. 30, 1958  G. E. KING ET AL  2,854,587
SWITCHING SYSTEMS
Filed Aug. 15, 1956

INVENTORS
George E. King and
Marshall P. White.
BY
ATTORNEY

United States Patent Office 2,854,587
Patented Sept. 30, 1958

2,854,587
SWITCHING SYSTEMS

George E. King, Eggertsville, and Marshall P. White, Cheektowaga, N. Y., assignors to Westinghouse Electric Corporation, East Pittsburgh, Pa., a corporation of Pennsylvania Application August 15, 1956, Serial No. 604,171

7 Claims. (Cl. 307—88)

Our invention relates, generally, to switching systems and, more particularly, to systems in which saturable reactors are utilized as contactless switches.

An object of our invention is to provide a circuit for a contactless switch which is more simple and lower in cost than the circuit described in a copending application of R. B. Immel and M. P. White, Serial No. 606,169, filed August 24, 1956.

Another object of our invention is to provide a switching system suitable for utilization with a control board having a plurality of magnetic logic elements thereon.

A further object of our invention is to provide a switching system in which a plurality of individually operable contactless switches may be energized through the same alternating current translating device.

Still another object of our invention is to reduce the amount of current drawn from the alternating current source during the half cycle in which the reactor is reset.

A still further object of our invention is to improve the voltage regulation of the circuit for a contactless switch of the saturable reactor type.

Other objects of our invention will be explained fully hereinafter or will be apparent to those skilled in the art.

In accordance with one embodiment of our invention resistors and rectifying elements are utilized in conjunction with a saturable reactor to provide a signal necessary for operating any of the magnetic logic elements on a control board. The saturation of the reactor is varied by a permanent magnet which is actuated by a quick-acting limit switch mechanism. When the core of the reactor is saturated, only a small part of the applied voltage is absorbed by the reactor and most of the voltage appears at the output terminals as half-wave direct current. When the core is unsaturated, the inductance and hence the impedance are very high and most of the applied voltage is absorbed by the reactor and substantially none appears at the output terminals of the switching system.

Figure 1:
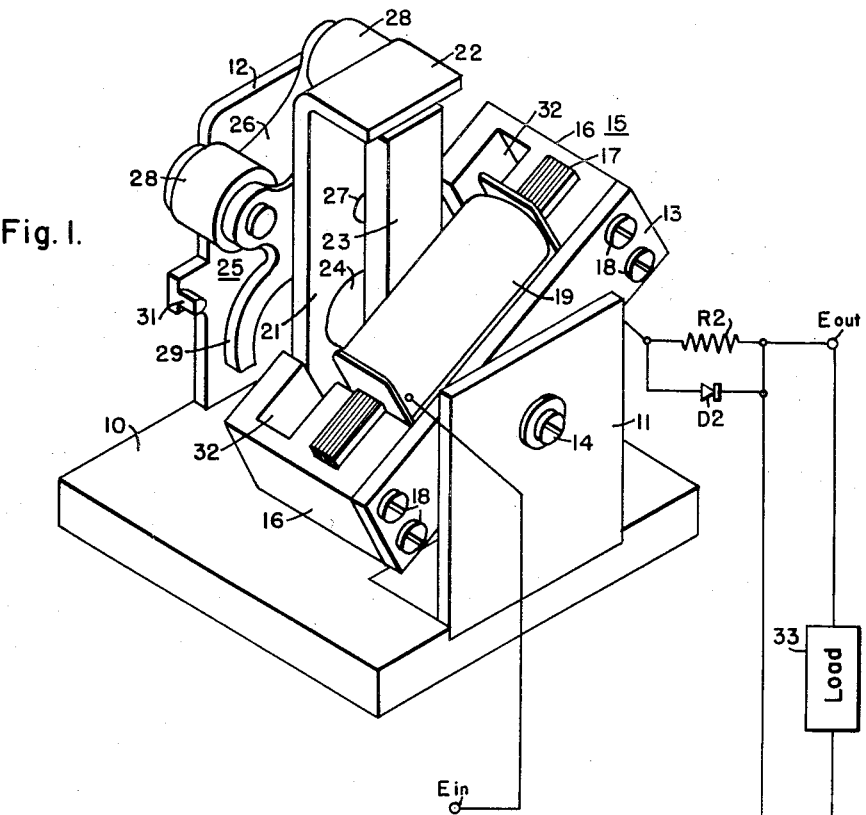
Figure 2:
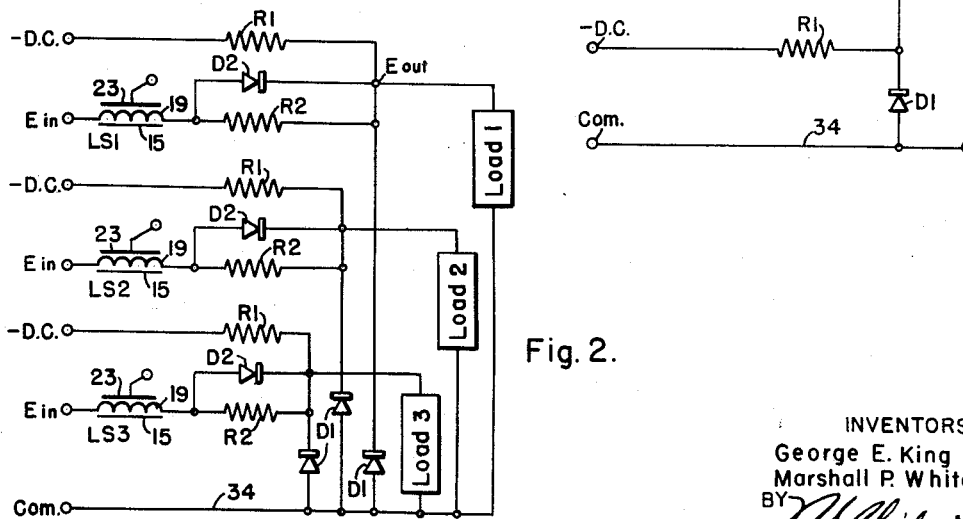

For a better understanding of the nature and objects of the invention, reference may be had to the following detailed description taken in conjunction with the accompanying drawing, in which:

Figure 1 is a diagrammatic view of a switching system embodying the principal features of the invention; and Fig. 2 is a diagrammatic view showing the manner of connecting a plurality of switching circuits on a control board.

Referring to the drawing, and particularly to Fig. 1, the switch structure shown therein, which may be of the type described in the copending application of R. B. Immel and M. P. White, Serial No. 606,169, filed August 24, 1956, comprises a base 10 having end brackets 11 and 12 attached thereto. A reactor mounting plate 13, which is composed of non-magnetic material, is adjustably attached to the end bracket 11 by means of a bolt 14. A two-legged reactor core 15, which is shown diagrammatically in Fig. 2, is held in place between two pole pieces 16 by end portions 17 as shown in Fig. 1. The pole pieces 16 are attached to the mounting plate 13 by screws 18. A coil 19 is disposed on each leg of the core 15. A magnetic keeper 21, having end portions 22, bent at a right angle to the body of the keeper, is mounted on the base 10.

A permanent magnet 23 is secured to a shaft 24 which is rotated by a quick-acting mechanism 25. The mechanism 25 may be of a type previously used for operating limit switches and is well known in the prior art as for example, in Halfvarson Patent No. 1,930,047, issued October 10, 1933. Briefly, the mechanism comprises a lever 26 which is pivotally mounted on a pin 27 secured to the keeper 21. Two rollers 28 are mounted on the lever 26. The rollers 28 may be alternately engaged by an arm or other means carried by a machine tool or other apparatus, the operation of which is controlled by the limit switch.

When one of the rollers 28 is engaged, an overcenter spring toggle mechanism (not shown) rotates the magnet 23 to the position shown in the drawing. When the other roller 28 is engaged, the quick-acting spring mechanism rotates the magnet 23 to a position between the pole pieces 16 and parallel with the reactor core. An arm 29 on the lever 26 engages a stop 31 on the end bracket 12 to limit the movement of the mechanism in the one direction. A similar arm (not shown) engages another stop to limit the movement in the other direction.

The reactor mounting plate 13 may be adjusted in position by being rotated on the reactor mounting bracket 11 and locked in any desired position. As shown, the reactor, comprising the core 15, the coils 19 and the pole pieces 16, is mounted at an angle of 60 degrees from the vertical or 30 degrees from the horizontal position. The keeper 21 is mounted vertically and, as previously explained, the magnet 23 may be actuated from the vertical position between the ends 22 of the keeper to a position parallel to the reactor core. When the magnet 23 is parallel to the reactor core it is disposed in grooves 32 provided in the pole pieces 16.

The two coils 19 of the reactor are connected in series-circuit relation. As shown in Fig. 1, the coils 19 are connected in series with a resistor R2. One terminal of one coil is connected to a terminal $E_{in}$. One terminal of the resistor R2 is connected to an output terminal $E_{out}$ of a control board. A load circuit 33 is connected between the output terminal and a common conductor 34. A suitable source of alternating current power is connected across the input terminal $E_{in}$ and the common conductor 34. A rectifying element D1, which has a high resistance to current flow in the one direction, is connected parallel to the load circuit 33. A similar rectifying element D2 is connected parallel to the resistor R2. A resistor R1, one terminal of which is connected to a negative D. C. voltage, provides a path for the reactor exciting current, thereby preventing the exciting current from flowing through the load circuit.

As explained in the aforesaid copending application, the reactor core 15 is saturated when the magnet 23 is between the pole pieces 16 and parallel to the reactor. When the reactor core is saturated, only a small part of the applied voltage is absorbed by the reactor, and most of the voltage appears across the load circuit as half-wave D. C. During one half of each cycle, when the voltage $E_{in}$ may be considered positive, current flows from the terminal $E_{in}$ through the coils of the reactor, the rectifier D2 and through the load circuit 33 to the common conductor 34. During the other half cycle, when $E_{in}$ may be considered negative, current flows from the common conductor 34 through the rectifier D1, the resistor R2 and the coils of the reactor to the terminal $E_{in}$.

When the magnet 23 is in the vertical position, as shown in Fig. 1, its flux is shunted through the keeper 21 and very little passes into the reactor core. Thus, the impedance of the reactor is very high and all of the applied voltage is absorbed by the reactor.

The negative D. C. voltage causes a current to flow from the common conductor 34 through the rectifier D1 in the forward direction. This current through D1 decreases when reactor exciting current flows. However, the current through R1 remains about the same. As long as the exciting current is less than the initial current through D1, there will be some forward current in D1 and the voltage at the load will be slightly negative.

The reactor exciting current lags the voltage $E_{in}$ by nearly 90 degrees and, therefore, is not 180 degrees out of phase with the negative D. C. current through the rectifier as is desirable. However, this only causes a slightly spiked output with a conduction angle of about 60 degrees. Tests show the phase of this spike to be about 90 degrees out of phase with the output voltage when the core is saturated and it has no adverse effect on the operation of the magnetic logic elements which the circuit controls.

It will be noted that when the voltage $E_{in}$ is positive, the output current does not flow through the resistor R2, but passes through the rectifier D2 which has a low forward voltage drop. Thus, the regulation of the circuit is improved.

When the voltage $E_{in}$ is negative, the reset or demagnetizing current flows through the resistor R2 and resets the limit switch reactor core. The ohmic value of the resistor R2 may be made relatively high, thereby reducing the reset or demagnetizing current.

The present circuit is particularly suitable for utilization with control boards having magnetic logic elements thereon. As shown in Fig. 2, a plurality of limit switches LS1, LS2, and LS3 may be connected to a control board to control a corresponding number of load circuits, all of which are connected to the common conductor 34. The present circuit does not require the provision of a separate secondary transformer winding for each limit switch as is required with the circuit described in the aforesaid copending application. Furthermore, a separate source of direct current is not required to prevent the reactor exciting current from flowing through the load circuit. With the present circuit, the only voltages required are the alternating current voltage and the negative D. C. voltage which are available on control boards having magnetic logic elements thereon of the type with which the present circuit is utilized. It will be understood that the proper phase relation between the alternating current voltage and the negative D. C. voltage must be maintained.

Logic circuits utilizing the present switching system are simpler and have more desirable characteristics than circuits designed with prior limit switch circuits. The present system requires only rectifying elements and resistors in conjunction with a contactless switching device of the saturable reactor type. Thus, it is apparent that we have provided a switching system which requires only apparatus which is simple in construction. Furthermore, the circuit connections are not complicated and a relatively large number of switching units may be provided on one control board.

Since numerous changes may be made in the above described construction, and different embodiments of the invention may be made without departing from the spirit and scope thereof, it is intended that all matter contained in the foregoing description or shown in the accompanying drawing shall be interpreted as illustrative and not in a limiting sense.

We claim as our invention:

1. In a switching system, in combination, a power circuit energized with alternating current, a load circuit connected across said power circuit, rectifying means connected to cause half-wave direct current to flow through the load circuit from the power circuit, a saturable reactor and a resistor connected in series with the power circuit, additional rectifying means connected parallel to said resistor, and magnetic means movable with reference to the reactor for varying the saturation of said reactor thereby controlling the voltage applied to the load circuit.

2. In a switching system, in combination, a power circuit energized with alternating current, a load circuit connected across said power circuit, rectifying means connected to cause half-wave direct current to flow through the load circuit from the power circuit, a saturable reactor and a resistor connected in series with the power circuit, additional rectifying means connected to bypass said resistor during alternate half-cycles, a movable magnet for varying the saturation of said reactor, and a quick-acting mechanism for actuating the magnet to control the voltage applied to the load circuit.

3. In a switching system, in combination, a power circuit energized with alternating current, a load circuit connected across said power circuit, rectifying means connected to cause half-wave direct current to flow through the load circuit from the power circuit, a saturable reactor and a resistor connected in series with the power circuit, additional rectifying means connected to by-pass said resistor during alternate half cycles, and a movable magnet for varying the saturation of said reactor thereby controlling the voltage applied to the load circuit.

4. In a switching system, in combination, a power circuit energized with alternating current, a load circuit connected across said power circuit, rectifying means connected to cause half-wave direct current to flow through the load circuit from the power circuit, a saturable reactor and a resistor connected in series with the power circuit, additional rectifying means connected to by-pass said resistor during the half cycle in which current is flowing through the load circuit, and movable magnetic means for varying the saturation of said reactor to control the voltage applied to the load circuit.

5. In a switching system, in combination, a power circuit energized with alternating current, a load circuit, rectifying means connected to cause half-wave direct current to flow through the load circuit from the power circuit, a saturable reactor and a resistor connected in series with the power circuit, additional rectifying means connected to by-pass said resistor during the half cycle in which current is flowing through the load circuit, a movable magnet for varying the saturation of said reactor, and a quick-acting mechanism for actuating the magnet to control the voltage applied to the load circuit.

6. In a switching system, in combination, a plurality of power circuit conductors energized with alternating current, a load circuit for each power circuit conductor, said load circuits being connected to a common conductor, rectifying means connected to said common conductor to cause half-wave direct current to flow through the load circuits from the power circuit conductors, a saturable reactor connected in series with each power circuit conductor, and individually movable magnetic means for varying the saturation of said reactors thereby controlling the voltage applied to each load circuit.

7. In a switching system, in combination, a plurality of power circuit conductors energized with alternating current, a load circuit for each power circuit conductor, said load circuits being connected to a common conductor, a rectifier for causing half-wave direct current to flow through each load circuit from the power conductor for the load circuit, said rectifiers being connected to said common conductor, a saturable reactor and a resistor connected in series with each power circuit conductor, an additional rectifier connected to by-pass each resistor during the half-cycle in which current is flowing through the load circuit, and an individually movable magnet for varying the saturation of each reactor to control the voltage applied to each load circuit.

References Cited in the file of this patent

UNITED STATES PATENTS

| 2,169,093 | Edwards | Aug. 8, 1939 |
| 2,736,869 | Rex | Feb. 28, 1956 |